(12) United States Patent
Kim et al.

(10) Patent No.: US 8,792,224 B2
(45) Date of Patent: Jul. 29, 2014

(54) HYBRID CAPACITOR

(75) Inventors: Hak Kwan Kim, Seoul (KR); Dong Hyeok Choi, Suwon-si (KR); Bae Kyun Kim, Gyeonggi-do (KR); Jun Hee Bae, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 200 days.

(21) Appl. No.: 13/448,236

(22) Filed: Apr. 16, 2012

(65) Prior Publication Data

US 2012/0293913 A1   Nov. 22, 2012

(30) Foreign Application Priority Data

May 16, 2011   (KR) .................. 10-2011-0045737

(51) Int. Cl.
*H01G 9/00*   (2006.01)
(52) U.S. Cl.
USPC ........... 361/502; 361/503; 361/504; 361/512; 361/525; 361/529; 429/231.3; 429/231.4; 429/223; 429/324
(58) Field of Classification Search
USPC ......... 361/502, 503–504, 509–512, 516–519, 361/523–525, 528–529; 429/223, 231.3, 429/231.4, 324
See application file for complete search history.

(56) References Cited

U.S. PATENT DOCUMENTS

| | | | | |
|---|---|---|---|---|
| 5,847,920 A | * | 12/1998 | Li et al. ........................ | 361/525 |
| 6,320,740 B1 | * | 11/2001 | Saito et al. .................... | 361/502 |
| 8,211,568 B2 | * | 7/2012 | Yamashita et al. ............ | 429/176 |
| 8,379,367 B2 | * | 2/2013 | Oh et al. ....................... | 361/502 |
| 8,435,672 B2 | * | 5/2013 | Bannai et al. ................. | 429/223 |
| 8,574,736 B2 | * | 11/2013 | Lee et al. ........................ | 429/94 |
| 8,644,006 B2 | * | 2/2014 | Hwang et al. ................. | 361/532 |

FOREIGN PATENT DOCUMENTS

JP   2001-351688 A   12/2001

* cited by examiner

*Primary Examiner* — Nguyen T Ha
(74) *Attorney, Agent, or Firm* — Bracewell & Giuliani LLP; Brad Y. Chin

(57) ABSTRACT

Disclosed herein is a hybrid capacitor including: a first structure including a cathode containing activated carbon and an anode containing lithium; and a second structure including activated carbon layers formed on both surfaces of a current collector. With the hybrid capacitor, characteristics of an LIC and characteristics of an EDLC are implemented in a single cell, thereby making it possible to increase energy density and improve output characteristics.

11 Claims, 3 Drawing Sheets

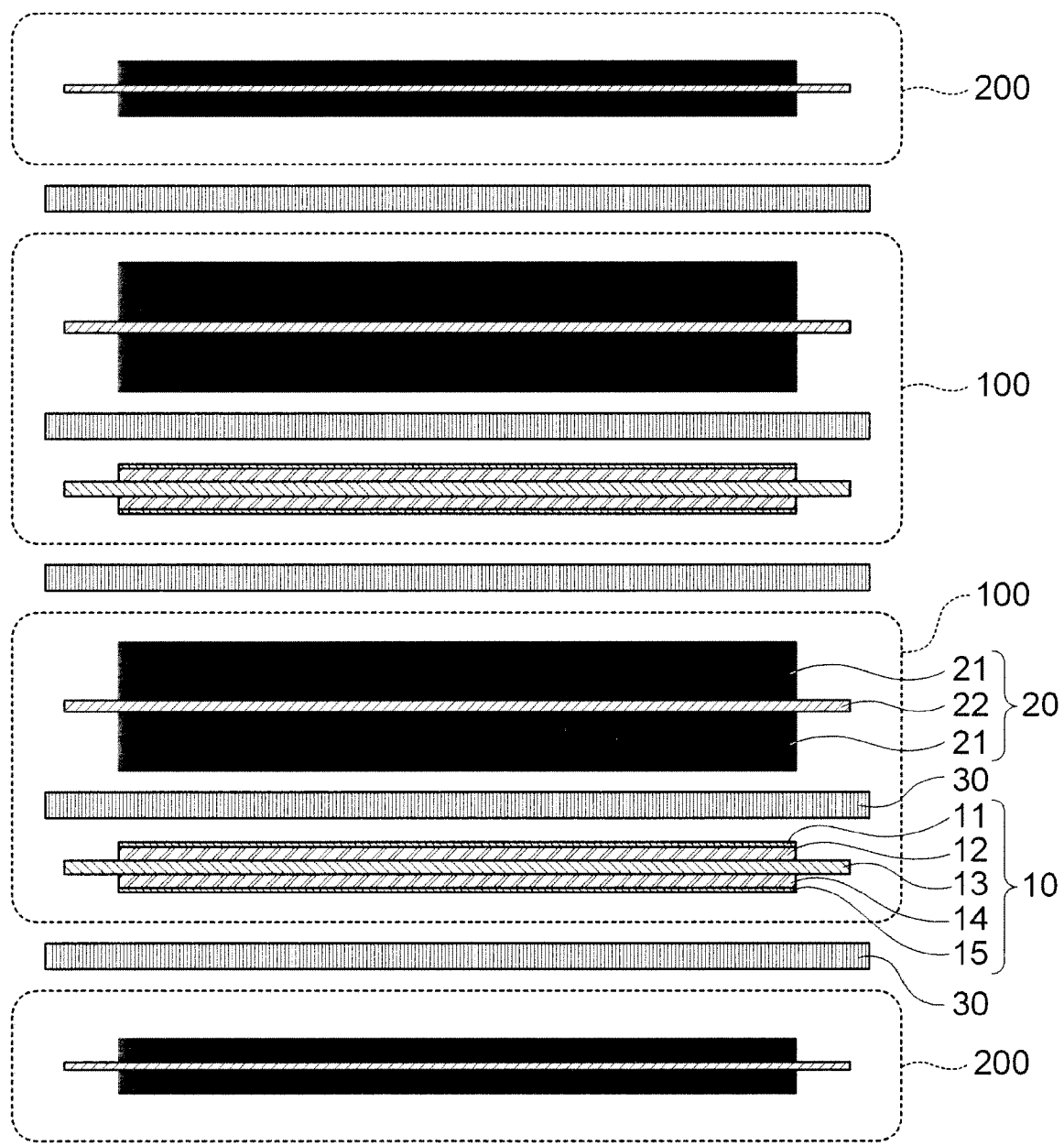

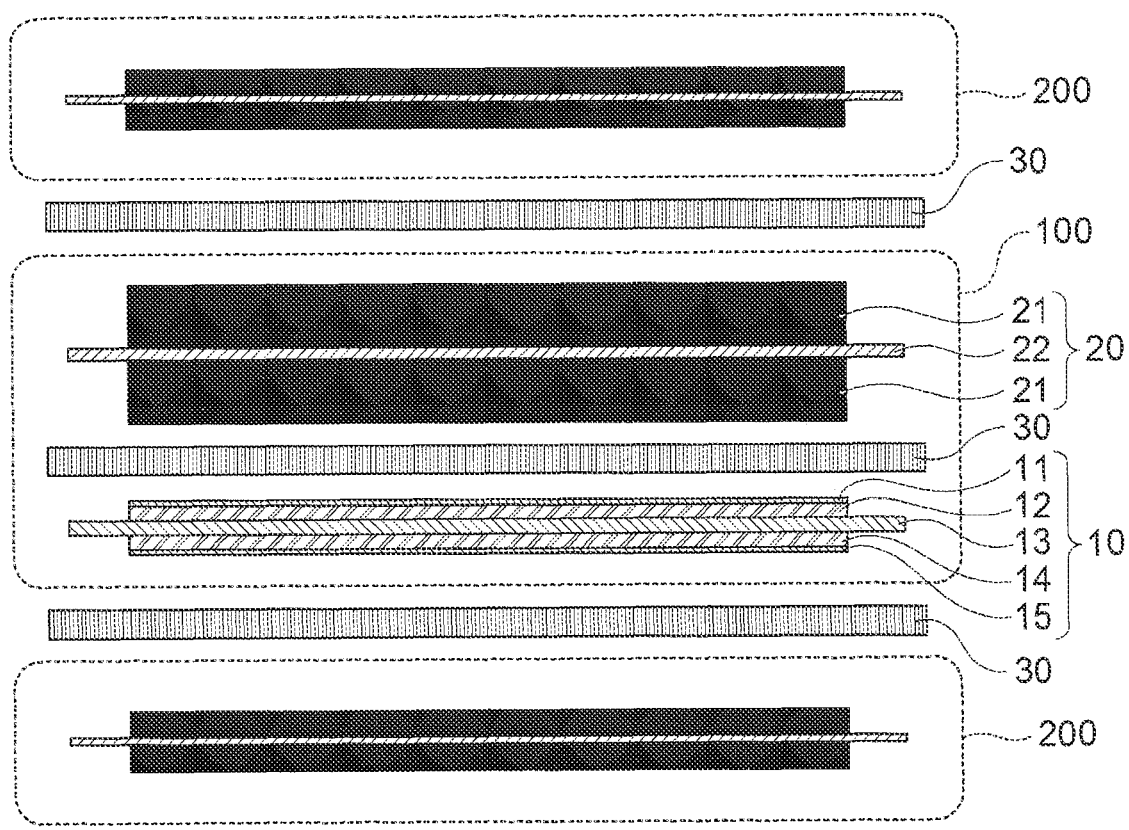

HYBRID CAPACITOR

CROSS REFERENCE(S) TO RELATED APPLICATIONS

This application claims the benefit under 35 U.S.C. Section 119 of Korean Patent Application Serial No. 10-2011-0045737, entitled "Hybrid Capacitor" filed on May 16, 2011, which is hereby incorporated by reference in its entirety into this application.

BACKGROUND OF THE INVENTION

1. Technical Field

The present invention relates to a hybrid capacitor, and more particularly, to a hybrid capacitor in which a complex structure of a lithium ion capacitor and an electric double layer capacitor is implemented in a single cell to thereby improve a manufacturing efficiency thereof and increase energy density and power density characteristics thereof.

2. Description of the Related Art

A secondary battery such as a lithium ion battery, or the like, which is a representative energy storage device having high energy density, has recently become prominent and has been used as an important energy storage device for various mobile electronic devices.

Among next generation energy storage devices, a device called an ultracapacitor or a supercapacitor has been prominent as a next generation energy storage device due to rapid charging and discharging speed, high stability, and environment-friendly characteristics.

The secondary battery has an advantage in that it has high energy density; however, it has a disadvantage in that it has limited output characteristics. The supercapacitor has an advantage in that it has output characteristics significantly higher than those of the secondary battery; however, it has a disadvantage in that it has low energy density.

In the case of the supercapacitor, a lithium pre-doping technology has been proposed in order to overcome the above-mentioned disadvantage. A lithium ion capacitor (LIC) having three to four times more energy density as compared to the energy density of the electric double layer capacitor according to the related art by using the above-mentioned technology has started to be commercialized.

Here, a kind of supercapacitors will be simply described. A general supercapacitor is configured of an electrode structure, a separator, an electrolyte solution, and the like. The supercapacitor is driven based on an electrochemical reaction mechanism that carrier ions in the electrolyte solution are selectively adsorbed to the electrode by applying power to the electrode structure. As representative supercapacitors, a lithium ion capacitor (LIC), an electric double layer capacitor (EDLC), a pseudocapacitor, a hybrid capacitor, and the like are currently used.

The lithium ion capacitor is a supercapacitor that uses a cathode made of activated carbon and an anode made of graphite, and uses lithium ions as carrier ions. The electric double layer capacitor is a supercapacitor that uses an electrode made of activated carbon and uses an electric double layer charging as a reaction mechanism. The pseudocapacitor is a supercapacitor which uses a transition metal oxide or a conductive polymer as an electrode and uses a pseudo-capacitance as a reaction mechanism. The hybrid capacitor is a supercapacitor having intermediate characteristics between the electric double layer capacitor and the pseudocapacitor.

However, the energy storage devices as described above have a relatively lower capacitance than a secondary battery. This is the reason that most of the supercapacitors as described above are driven by a charging and discharging mechanism using the movement of carrier ions on the interface between the electrode and the electrolyte solution and a chemical reaction on the surface of the electrode. Therefore, in an energy storage device such as a supercapacitor, a need currently exists for developing a technology that improves a relatively low capacitance.

Meanwhile, in both of the lithium ion secondary battery (LIB) and the lithium ion capacitor (LIC) as described above, graphite, which is a carbon material, has been mainly used as a material of an anode. Particularly, in the case of the LIC, in order to increase energy density, the anode lithiated so that it has a potential of 0.1 V or less has been used. Here, as a method of lithiating the anode, several methods may be used. However, a method of immersing the anode in an ethylene carbonate (EC) based electrolyte solution containing lithium salts has been mainly used. In this case, a solid electrolyte interface (SEI) film is formed on a surface of the graphite. This SEI film passes lithium ions therethrough and is cointercalated with solvent molecules to thereby suppress a side effect that graphite layers are peeled off. Therefore, it has been known that the SEI film is a factor having an important effect on characteristics of the LIC and the LIB.

However, since the SEI film is formed at an initial stage, an initial charging and discharging efficiency and a capacitance of the graphite having a large irreversible capacitance are inevitably reduced. In addition, in a propylene carbonate (PC) based electrolyte solution having excellent low temperature characteristics, the SEI film is not formed; rather, gas is generated. Therefore, it has been known that low temperature characteristics of the LIC become poorer than those of the EDLC. Further, in a process of doping the anode with lithium, it is difficult to perform uniform doping, a long time is required, and a performance is unstable, such that there is a limitation in commercialization. Furthermore, the LIC cannot but basically have deteriorated power characteristics due to non-polarization characteristics of the anode, as compared to the EDLC.

Meanwhile, in order to overcome the disadvantages of the secondary battery, research into and development for a technology of systematically combining the EDLC with the existing lithium ion polymer battery have been conducted. As a result of the research and development, a complex battery capable of increasing an instantaneous output and having increased energy density has been proposed. However, the complex battery has a complicated structure in view of a circuit or a manufacturing process thereof and has an increased mounting space, such that it runs counter to the trend toward miniaturization of the battery.

A need for a technology capable of basically solving the above-mentioned problems gradually increases.

SUMMARY OF THE INVENTION

An object of the present invention is to provide a hybrid capacitor having an increased output and capacitance.

Another object of the present invention is to provide a hybrid capacitor in which one cell includes an electrode structure implementing a relative high capacitance and an electrode structure implementing a relative high output, such that only advantages of the existing LIC and EDLC may be combined with each other using a complex reaction mechanism through the electrode structures.

According to an exemplary embodiment of the present invention, there is provided a hybrid capacitor that includes a cathode, an anode, a separator and an electrolyte solution, the hybrid capacitor, including: a first structure including a cathode containing activated carbon and an anode containing lithium; and a second structure including activated carbon layers formed on both surfaces of a current collector.

According to another exemplary embodiment of the present invention, there is provided a hybrid capacitor including: a first structure including a cathode containing activated carbon and an anode containing lithium; and second structures each disposed on both sides of the first structure, the second structure including activated carbon layers formed on both surfaces of a current collector.

The cathode and the anode may include a separator provided therebetween.

The first and second structures may include a separator provided therebetween.

The cathode may be formed by attaching a conductive material, activated carbon, and a binder to both surfaces of a current collector.

The current collector may be an aluminum foil.

The anode may include lithium metal layers formed on both surfaces of a current collector.

The current collector may be a copper foil.

The lithium metal layers may further include lithium nitride ($Li_3N$) layers formed on outer surfaces thereof.

The second structure may be formed by attaching a material containing 5 to 10 wt % of conductive material, 80~90 wt % of activated carbon, and 5~10 wt % of binder to both surfaces of the current collector.

The electrolyte solution may be a mixture of a lithium salt and a non-lithium salt.

According to another exemplary embodiment of the present invention, there is provided a hybrid capacitor including: a first electrode including lithium layers formed on both surfaces of a current collector; a second electrode including activated carbon layers formed on both surfaces of an aluminum foil; and a third electrode including activated carbon layers formed on both surfaces of a current collector, wherein the electrodes are disposed in the order of the third electrode, the first electrode, the second electrode, and the third electrode.

At least two combinations of the first and second electrodes may be disposed between the two third electrodes disposed at an outermost portion of the hybrid capacitor.

The electrodes may include separators provided thereamong.

The first electrode may include lithium metal layers formed on both surfaces of a current collector.

The current collector may be a copper foil.

The lithium metal layers may further include lithium nitride ($Li_3N$) layers formed on outer surfaces thereof.

The second electrode may be formed by attaching a conductive material, activated carbon, and a binder to both surfaces of an aluminum foil.

The third electrode may be formed by attaching a material containing 5 to 10 wt % of conductive material, 80~90 wt % of activated carbon, and 5~10 wt % of binder to both surfaces of the current collector.

The electrolyte solution may be a mixture of a lithium salt and a non-lithium salt.

The lithium salt may be at least one selected from a group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, and $CF_3SO_3Li$, $LiC(CF_3SO_2)_3$.

The non-lithium salt may be at least one selected from a group consisting of $TEABF_4$, $TEMABF_4$, $SBPBF_4$, $EMIBF_4$, $DEMEBF_4$.

BRIEF DESCRIPTION OF THE DRAWINGS

FIG. 2 is a view schematically showing a hybrid capacitor according to another exemplary embodiment of the present invention.

FIG. 3 is a view schematically showing a hybrid capacitor according to an exemplary embodiment of the present invention.

DESCRIPTION OF THE PREFERRED EMBODIMENTS

Figure 1:
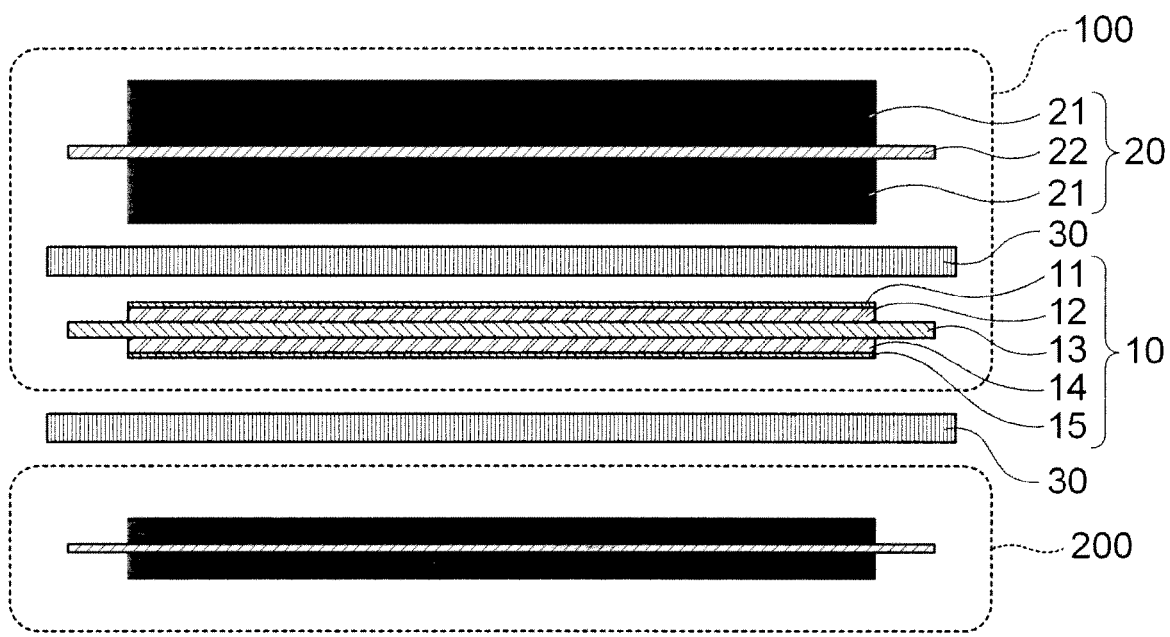
FIG. 1 is a view schematically showing a hybrid capacitor according to an exemplary embodiment of the present invention.

Various advantages and features of the present invention and methods accomplishing thereof will become apparent from the following description of embodiments with reference to the accompanying drawings. However, the present invention may be modified in many different forms and it should not be limited to the embodiments set forth herein. These embodiments may be provided so that this disclosure will be thorough and complete, and will fully convey the scope of the invention to those skilled in the art. Like reference numerals throughout the description denote like elements.

Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Hereinafter, an energy storage device according to the present invention will be described in detail with reference to the accompanying drawings.

FIG. 1 is a view schematically showing a hybrid capacitor according to an exemplary embodiment of the present invention.

Referring to FIG. 1, a hybrid capacitor according to an exemplary embodiment of the present invention is configured to include a first structure 100 including a cathode 20 containing activated carbon 21 and an anode 10 containing lithium; and a second structure 200 including activated carbon layers formed on both surfaces of a current collector.

When the hybrid capacitor is configured as shown in FIG. 1 a charging and discharging process may be performed between the anode 10 and the cathode 20 and between the anode 10 and the second structure 200 by the same mechanism as that of a lithium ion capacitor (LIC).

FIG. 3 is a view schematically showing a hybrid capacitor according to an exemplary embodiment of the present invention. Referring to the FIG. 3 each of the second structures 200 including the activated carbon layers formed on both surfaces of the current collector may be disposed on both sides of the first structure 100 including the cathode 20 containing the activated carbons and the anode 10 containing the lithium. In this configuration, a charging and discharging process may be performed between the anode 10 and the cathode 20 and between the anode 10 and the second structure 200 by the same mechanism as that of the LIC and be performed between the cathode 20 and the second structure 200 by the same mechanism as that of an electric double layer capacitor (EDLC).

In this configuration, the cathode 20 and the anode 30 and/or the first structure 100 and the second structure 200 may include a separator 30 provided therebetween.

The cathode 20 may be formed by attaching a conductive material, activated carbon, and a binder to both surfaces of a current collector. Particularly, the current collector 22 may be an aluminum foil.

Meanwhile, the anode 10 is mainly made of graphite, similar to the general LIC according to the related art, and may be pre-doped with lithium and then used.

However, according to another exemplary embodiment of the present invention, lithium metal layers 12, 14 are included in the anode 10 in order to reduce the possibility of short circuit generation due to the growth of a lithium electrode in the LIC according to the related art. In this configuration, as the current collector 13, a copper foil is used.

In addition, the lithium metal layers 12, 14 may further include lithium nitride ($Li_3N$) layers 11, 15 formed on outer surfaces thereof.

The lithium nitride is also called transition metal doped lithium nitride. A technology capable of controlling the number of lithium ion vacancies and the degree of transition metal substitution has been developed, such that applicability has increased. The lithium nitride is an excellent anode material for a rechargeable battery. Since electron conductivity and ion conductivity of the lithium nitride are determined by the number of vacancies existing in an internal structure thereof, the technology capable of controlling the number of lithium ion vacancies and the degree of transition metal substitution has been developed, thereby making it possible to expect a considerable ripple effect.

Since atomic lithium theoretically has a high capacitance and an excellent oxidation-reduction property, it has been recognized as an optimal anode material. However, the atomic lithium easily decomposes, such that it has low structural stability. In order to supplement this problem, lithium doped graphite has been developed.

Since the lithium nitride has high structural stability and capacitance, it is regarded as the most prominent material capable of replacing the lithium doped graphite. Pure lithium nitride has excellent ion conductivity; however, it has lower electric conductivity. Therefore, it is preferable to increase electric conductivity by doping the pure lithium nitride with a specific transition metal.

The lithium nitride has a special laminar structure in which a lithium-only layer is interposed between layers in which lithium and nitrogen coexist. It was found that transition metal substitution is selectively generated only in the lithium-only layer. When lithium ions composing the lithium-only layer are substituted with the transition metal, lithium ions composing the lithium-nitrogen layer are removed, such that vacancies occur.

Since ionic conduction of the lithium nitride is created in a process in which the lithium ions move to the vacancies, as the number of vacancies increases, conductivity increases. A temperature and a time of a synthesis reaction of the transition metal doped lithium nitride are controlled, thereby making it possible to control the number of lithium ion vacancies and a substituted area. When the amount of transition metal is fixed and a reaction temperature is increased, the lithium ion vacancies are increased. It means that electric conductivity and ion conductivity of the doped lithium nitride may be controlled by controlling a reaction temperature or a reaction time in a synthesis process.

Since the lithium nitride has the characteristics as described above, it may be used as an anode material of the hybrid capacitor, instead of the lithium doped graphite according to the related art. According to an exemplary embodiment of the present invention, the lithium nitride is used, thereby making it possible to solve a short circuit problem due to the growth of the lithium electrode according to the related art. Furthermore, it is possible to solve problems such as an inefficiency and a limitation in reliability due to the lithium pre-doping process that has been necessarily performed in order to implement the lithium doped graphite according to the related art.

Meanwhile, the second structure 200 may be formed by attaching a material containing 5 to 10 wt % of conductive material, 80~90 wt % of activated carbon, and 5~10 wt % of binder to both surfaces of the current collector.

The second structure 200 may serve to increase energy density and improve output characteristics within a cell. However, in the case of the hybrid capacitor according to an exemplary embodiment of the present invention, the increase in energy density may be accomplished by the lithium metal layer or the lithium nitride and improvement in output characteristics may be accomplished by the electrode containing the activated carbon. Meanwhile, the second structure 200 is introduced, thereby making it possible to reduce the entire resistance of the cell and allow a process of storing and discharging an electrical energy generated by a physicochemical mechanism between electrodes to be efficiently performed.

Therefore, the second structure 200 is formed to have a higher content of conductive material and a thinner thickness than those of the general electrode made of the activated carbon, thereby making it possible to accomplish an object of reducing the entire resistance of the cell.

Meanwhile, a mixture of lithium salts and non-lithium salts may be used as an electrolyte solution.

More specifically, at least one of lithium salts such as $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, and the like, and at least one of non-lithium salts for the EDLC such as $TEABF_4$, $TEMABF_4$, $SBPBF_4$, $EMIBF_4$, $DEMEBF_4$, and the like, are mixed with each other in a non-aqueous solvent for a supercapacitor or a secondary battery, making it possible to maximize a capacitance increase effect due to adsorption and desorption of other element ions in addition to intercalation and deintercalation effects of the lithium ions. In addition, a generation amount of a hydrogen fluoride (HF) by hydrolysis is smaller as compared to the existing single lithium salt electrolyte solution, thereby making it possible to increase a lifespan of the supercapacitor.

In a preparatory experiment, since the lithium salt has the highest ion conductivity, the LiPF6 currently most used as the lithium salt was mixed with each of the three non-lithium salts for the EDLC and capacitances thereof were measured. As a result of the measurement, it was shown that all of three mixtures have a higher capacitance as compared to a single salt.

FIG. 2 is a view schematically showing a hybrid capacitor according to another exemplary embodiment of the present invention.

A hybrid capacitor according to another exemplary embodiment of the present invention may include a first electrode 10 including lithium layers formed on both surfaces of a current collector 13; a second electrode 20 including activated carbon layers 21 formed on both surfaces of an aluminum foil 22; and a third electrode 200 including activated carbon layers formed on both surfaces of a current collector, wherein the electrodes are disposed in the order of the third electrode 200, the first electrode 10, the second electrode 20, and the third electrode 200.

In this configuration, at least two combinations of the first and second electrodes 10, 20 are disposed between the two third electrodes 200 disposed at an outermost portion of the hybrid capacitor, thereby making it possible to increase energy density of a cell. As a result, the energy density of the cell may be simply controlled by the number of first and second electrodes 10, 20. In addition, in this configuration, the electrodes may include separators 30 provided thereamong.

Further, the first electrode 10 may include lithium metal layers 12, 14 formed on both surfaces of a current collector 13. Here, the current collector 13 may be a copper foil.

In addition, the lithium metal layers 12, 14 may further include lithium nitride ($Li_3N$) layers 11, 15 formed on outer surfaces thereof. Since the reason has been described above, an overlapped description will be omitted.

In the hybrid capacitor according to the exemplary embodiments of the present invention configured as described above, a charging and discharging process may be performed between the first and second electrodes 10, 20 and between the first and third electrodes 10, 200 by the same mechanism as that of the LIC, and be performed between the second and third electrodes 20, 200 by the same mechanism as that of an electric double layer capacitor (EDLC) according to the related art. Reaction mechanisms of the LIC and the EDLC are already known technologies. Therefore, a detailed description thereof will be omitted.

Meanwhile, the anode 10 of the first structure 100 described above may correspond to the first electrode 10, the cathode 20 thereof may correspond to the second electrode 20, and the second structure 200 may correspond to the third electrode 200.

With the above-mentioned configuration and operating principle, it is possible to implement a novel hybrid capacitor in which only advantages of the LIC and the EDLC are combined with each other.

With the hybrid capacitor according to the exemplary embodiment of the present invention, characteristics of an LIC and characteristics of an EDLC are implemented in a single cell, thereby making it possible to increase energy density and improve output characteristics.

In addition, it is possible to solve a short circuit problem due to the gradual growth of the lithium ions in the anode as well as problems such as a reduction in process efficiency, an increase in cost, and a limitation in securing reliability, and the like, due to lithium pre-doping that has existed in the LIC according to the related art.

Further, the hybrid capacitor includes the electrode having a high content of conductive material and a thin thickness, thereby making it possible to improve the output characteristics simultaneously with reducing the entire resistance of the cell. Furthermore, the number of the electrodes within the hybrid capacitor are increased or decreased as needed, thereby making it possible to easily set required energy density.

The present invention has been described in connection with what is presently considered to be practical exemplary embodiments. Although the exemplary embodiments of the present invention have been described, the present invention may be also used in various other combinations, modifications and environments. In other words, the present invention may be changed or modified within the range of concept of the invention disclosed in the specification, the range equivalent to the disclosure and/or the range of the technology or knowledge in the field to which the present invention pertains. The exemplary embodiments described above have been provided to explain the best state in carrying out the present invention. Therefore, they may be carried out in other states known to the field to which the present invention pertains in using other inventions such as the present invention and also be modified in various forms required in specific application fields and usages of the invention. Therefore, it is to be understood that the invention is not limited to the disclosed embodiments. It is to be understood that other embodiments are also included within the spirit and scope of the appended claims.

What is claimed is:

1. A hybrid capacitor comprising:
a first electrode including lithium layers formed on both surfaces of a current collector;
a second electrode including activated carbon layers formed on both surfaces of an aluminum foil; and
a third electrode including activated carbon layers formed on both surfaces of a current collector,
wherein the electrodes are disposed in the order of the third electrode, the first electrode, the second electrode, and the third electrode.

2. The hybrid capacitor according to claim 1, wherein at least two combinations of the first and second electrodes are disposed between the two third electrodes disposed at an outermost portion of the hybrid capacitor.

3. The hybrid capacitor according to claim 1, wherein the electrodes include separators provided thereamong.

4. The hybrid capacitor according to claim 1, wherein the first electrode includes lithium metal layers formed on both surfaces of a current collector.

5. The hybrid capacitor according to claim 4, wherein the current collector is a copper foil.

6. The hybrid capacitor according to claim 4, wherein the lithium metal layers further include lithium nitride ($Li_3N$) layers formed on outer surfaces thereof.

7. The hybrid capacitor according to claim 1, wherein the second electrode is formed by attaching a conductive material, activated carbon, and a binder to both surfaces of an aluminum foil.

8. The hybrid capacitor according to claim 1, wherein the third electrode is formed by attaching a material containing 5 to 10 wt % of conductive material, 80~90 wt % of activated carbon, and 5~10 wt % of binder to both surfaces of the current collector.

9. The hybrid capacitor according to claim 1, wherein the electrolyte solution is a mixture of a lithium salt and a non-lithium salt.

10. The hybrid capacitor according to claim 9, wherein the lithium salt is at least one selected from a group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, and $CF_3SO_3Li$, $LiC(CF_3SO_2)_3$.

11. The hybrid capacitor according to claim 9, wherein the non-lithium salt is at least one selected from a group consisting of $TEABF_4$, $TEMABF_4$, $SBPBF_4$, $EMIBF_4$, $DEMEBF_4$.

* * * * *